United States Patent

Harvey

[11] Patent Number: 5,881,831
[45] Date of Patent: Mar. 16, 1999

[54] MULTI-TERRAIN AMPHIBIOUS VEHICLE

[75] Inventor: William B. Harvey, Olney, Md.

[73] Assignee: Intelligent Automation, Inc., Rockville, Md.

[21] Appl. No.: 857,332

[22] Filed: May 16, 1997

[51] Int. Cl.$^6$ .......................... B62D 11/02; B62D 57/02; B62D 61/10; B63H 1/04
[52] U.S. Cl. ................ 180/6.2; 180/731; 180/24.08; 180/24.11; 180/22; 114/270; 440/90
[58] Field of Search ..................... 180/6.2, 6.48, 180/6.5, 6.62, 7.1, 8.1, 8.2, 8.7, 22, 24.06, 24.07, 24.08, 24.11, 24.12; 114/270; 440/90

[56] References Cited

U.S. PATENT DOCUMENTS

| | | | |
|---|---|---|---|
| 1,100,238 | 6/1914 | Hensley | 114/270 |
| 3,418,960 | 12/1968 | Nelson | 114/270 |
| 3,435,798 | 4/1969 | Rieli | 180/6.48 |
| 3,499,501 | 3/1970 | Fitzgerald et al. | 180/8.2 |
| 4,200,161 | 4/1980 | Penington, Jr. | 180/8.2 |
| 4,575,354 | 3/1986 | Wakayama et al. | 180/7.1 |
| 4,730,684 | 3/1988 | Pedersen | 180/8.2 |
| 5,701,965 | 12/1997 | Kamen et al. | 180/6.5 |

*Primary Examiner*—Peter C. English
*Attorney, Agent, or Firm*—Rosenberg, Klein & Bilker

[57] ABSTRACT

A multi-terrain amphibious vehicle adapted for travel across surfaces of various type and attributes is provided. The vehicle includes a chassis assembly (10) which extends in a longitudinal direction; a plurality of propulsion members rotatably coupled to that chassis assembly for propelling the vehicle across a given surface; and, a control mechanism for controlling the rotational velocities and phases of the propulsion members. The propulsion members each rotate about an axis that extends in a direction substantially normal to the longitudinal direction. Each propulsion member includes, for engaging the given surface, at least a first perimeter segment and a second perimeter segment coaxially disposed in angularly offset manner about its rotation axis. The first perimeter segment has an arcuate contour and extends radially farther from the rotation axis than does the second perimeter segment. In operation, the propulsion members are cooperatively rotated to collectively impart a predetermined speed and direction of travel to the vehicle.

4 Claims, 7 Drawing Sheets

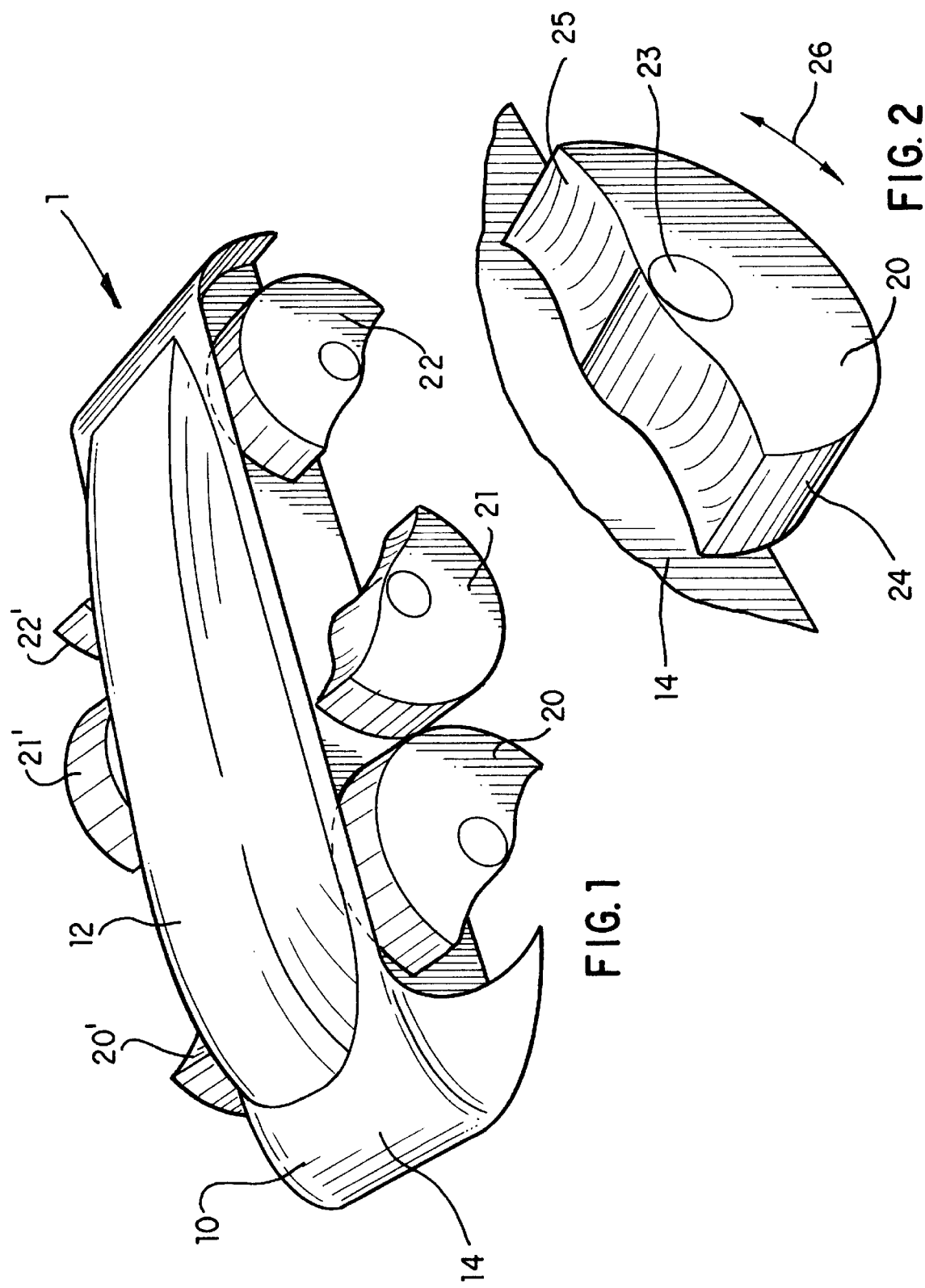

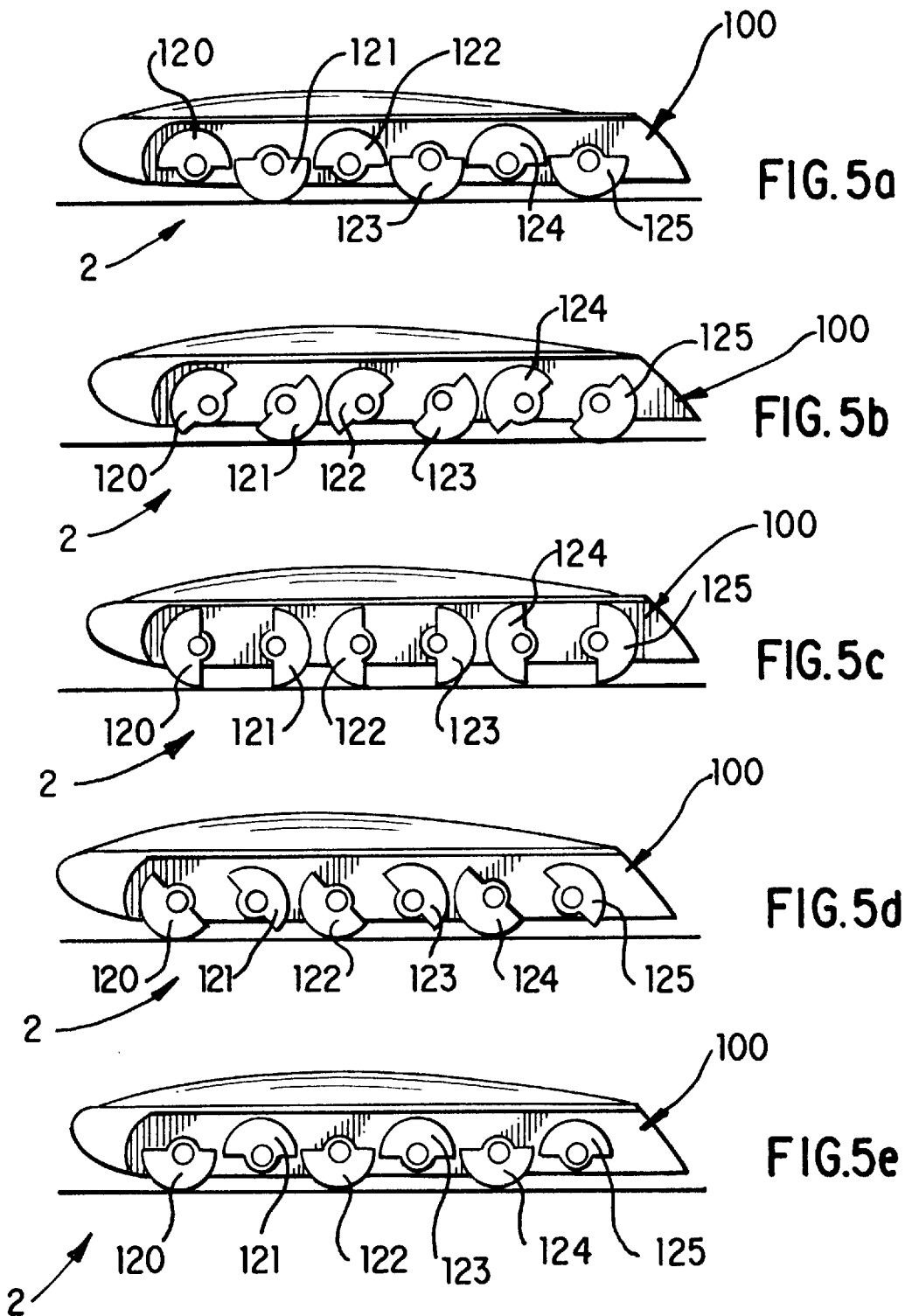

MULTI-TERRAIN AMPHIBIOUS VEHICLE

BACKGROUND OF THE INVENTION

1. Field of the Invention

The subject multi-terrain amphibious vehicle is generally directed to vehicles capable of traveling across surfaces of various type. More specifically, the multi-terrain amphibious vehicle is one that may efficiently propel itself across water surfaces and effectively traverse both even and uneven terrain without substantial loss of traction. The subject multi-terrain amphibious vehicle is, moreover, one which is capable of crossing from one surface type onto another without undue interruption during the transition.

In many applications of surface vehicles, both military and non-military, the vehicle is likely to encounter widely varied types of surfaces in transporting its payload. It may not only encounter both water and land surfaces, it may encounter land surfaces of greatly varied terrain and surface characteristics. In most cases, time and other resource constraints do not permit avoidance measures by which the vehicle may circumvent or otherwise avoid operation on surface types for which the vehicle is not particularly suited. Consequently, the unexpected characteristics of the surface to be traversed often make for insurmountable obstacles which delay, if not altogether halt, the vehicle's mission. Even where the vehicle is capable of traversing the surface types encountered, efficient traversal may not be possible because significant reconfiguration of one or more parts of the vehicle may be necessary if it is to continue its travel across a surface of significantly different attributes.

Accordingly, there is a need for a versatile vehicle which is equally adept at traveling not only through both water and land surfaces, but also land surfaces of widely varied attributes such as evenness, hardness, and solidity. There is a need for a versatile vehicle also capable of overcoming abrupt transitions in surface characteristics without the accompanying need to incur undue interruption in the vehicle's operation.

2. Prior Art

Amphibious vehicles capable of traveling across both water and land surfaces are known in the prior art, as are multi-terrain vehicles capable of traveling across land surfaces of more than one identifiable surface or terrain characteristic. For instance, hover-type vehicles are known which generate and maintain therebeneath a uniformly distributed cushion of air which enables it to glide over relatively smooth water and land surfaces. Where surface characteristics are such that the air cushion formed beneath the vehicle is sufficiently disrupted, however, suspension of the vehicle over the underlying surface would be disturbed, causing obstruction of the vehicle's travel.

Other types of amphibious vehicles are known, particularly those employed for military applications. One type of such vehicles is the class of payload transport vehicles functionally configured with hulled bottoms, much like typical waterborne surface vessels. Those vehicles are constructed with wheels mounted to extend from their hulled bottoms which enable them to roll along land surfaces. As with hover-type crafts, these vehicles are extremely limited in their ability to traverse any land surface beyond the flattest and smoothest of surfaces encountered. Their travel over muddy, rocky, snow-covered, or other types of surfaces potentially encountered in typical combat situations is virtually impossible.

High traction vehicles specifically designed for operation on such difficult-to-traverse surfaces are also known in the prior art. Those vehicles are of the tracklaying type employing a pair of multi-linked tracks which are advanced through an endless loop by a plurality of drive wheels. The tracks grip the underlying surface such that its linear advancement through the endless loop about the drive wheels causes the vehicle's advancement over the land surface. While tracks are effective in providing traction over rough, irregular surfaces not readily passable to simple wheeled vehicles, the extraneous friction inherently resulting from their operation makes their utilization on smooth, flat surfaces extremely inefficient. Moreover, as the durability and strength required of tracks demand in most cases that they be fabricated from steel, iron, or other hard and dense materials, tracks have been found to be quite destructive to paved road surfaces. As for water-borne applications or any other applications requiring some measure of buoyancy in the vehicle, tracklaying vehicles have, for self-evident reasons failed to find significant utility.

There is, therefore, no vehicle known in the prior art capable of efficiently propelling itself across water surfaces as well as land surfaces of various terrain and surface characteristics. There is also no vehicle known in the prior art capable of overcoming significant transitions in surface attributes without prior preparation that demands substantial mechanical reconfiguration and necessitates interruption of the vehicle's travel.

SUMMARY OF THE INVENTION

It is a primary object of the present invention to provide a vehicle adapted for efficient travel across water surfaces as well as land surfaces exhibiting various attributes.

It is another object of the present invention to provide a vehicle adapted for maintaining efficient, propulsive engagement with both land and water surfaces.

It is another object of the present invention to provide a vehicle adapted for transitioning between travel over one surface to travel over another surface having significantly different attributes without the need for substantial reconfiguration or substantial interruption of its travel.

It is another object of the present invention to provide a vehicle adapted for stable operation over surfaces having various attributes.

It is another object of the present invention to provide a vehicle which is easily adjustable in its ability to propel itself across a given surface.

It is yet another object of the present invention to provide a vehicle which is simple both in its operation and structure.

These and other objects are attained in the multi-terrain amphibious vehicle of the present invention. The vehicle comprises a longitudinally extended chassis assembly and a plurality of non-circular propulsion members rotatably coupled to that chassis assembly for propelling the vehicle across a given surface. Each of the propulsion members is rotatable about a rotation axis extending in a direction substantially normal to the longitudinal extent of the chassis assembly. Each propulsion member includes a first perimeter segment and a second perimeter segment disposed in angularly offset manner adapted for engaging the given surface over which the vehicle is to travel. Of these perimeter segments, the first perimeter segment is formed with an arcuate contour and extends radially farther from the propulsion member's rotation axis than does the second perimeter segment. The vehicle also includes a control mechanism for controlling the rotational velocities and phases of the respective propulsion members such that the propulsion members are cooperatively rotated to collectively impart a predetermined speed and direction of travel to the vehicle.

In one embodiment, the multi-terrain amphibious vehicle of the present invention includes a plurality of propulsion members on each of two opposing side surfaces thereof. Each propulsion member includes an arcuate first perimeter segment which extends angularly about the given propulsion member's rotation axis to subtend an angle of substantially 180°. The second perimeter segment of each propulsion member in that preferred embodiment forms an undulating surface.

Also in the embodiment of the present invention, the control mechanism maintains independent control over the rotational velocities of the respective propulsion member groups on opposing sides of the vehicle's chassis assembly, as well as independent control over the rotational phases of each propulsion member. Accordingly, the control mechanism includes independently actuable drive and phase setting mechanisms. These mechanisms are realized by the mechanical coupling of a given propulsion member to a drive gear through an endless drive chain loop engaged therewith. The endless drive chain loop defines a loop contour, and the rotational phase setting of the propulsion member is altered by altering this loop contour.

In an alternate embodiment of the present invention, a plurality of propulsion members are coaxially mounted in adjacent manner to form a propulsion member unit. While a given propulsion member unit is rotatable about its rotation axis, the propulsion members in a common group are mounted in such manner that their first perimeter segments remain angularly offset about the rotation axis one from the other. These propulsion members are rotated about the axis as a unit, the combined action of the multiple propulsion members augmenting the stability and overall traction obtained at one 'wheel' site on the vehicle.

BRIEF DESCRIPTION OF THE DRAWINGS

FIG. 1 is a perspective view of one preferred embodiment of the present invention;

FIG. 2 is a perspective view, partially cut-away, of a portion of the embodiment shown in FIG. 1;

FIG. 5a is an elevational view of the alternate embodiment shown in FIG. 4 with the relative phase relationships between the propulsion members altered from those shown in FIG. 4, illustrating the angular orientation of the propulsion members at a first point in time;

FIG. 5b is an elevational view of the alternate embodiment shown in FIG. 5a, illustrating the angular orientation of the propulsion members at a second point in time;

FIG. 5c is an elevational view of the alternate embodiment shown in FIG. 5a, illustrating the angular orientation of the propulsion members at a third point in time;

FIG. 5d is an elevational view of the alternate embodiment shown in FIG. 5a, illustrating the angular orientation of the propulsion members at a fourth point in time;

FIG. 5e is an elevational view of the alternate embodiment shown in FIG. 5a, illustrating the angular orientation of the propulsion members at a fifth point in time;

DETAILED DESCRIPTION OF THE PREFERRED EMBODIMENTS

Figure 3:
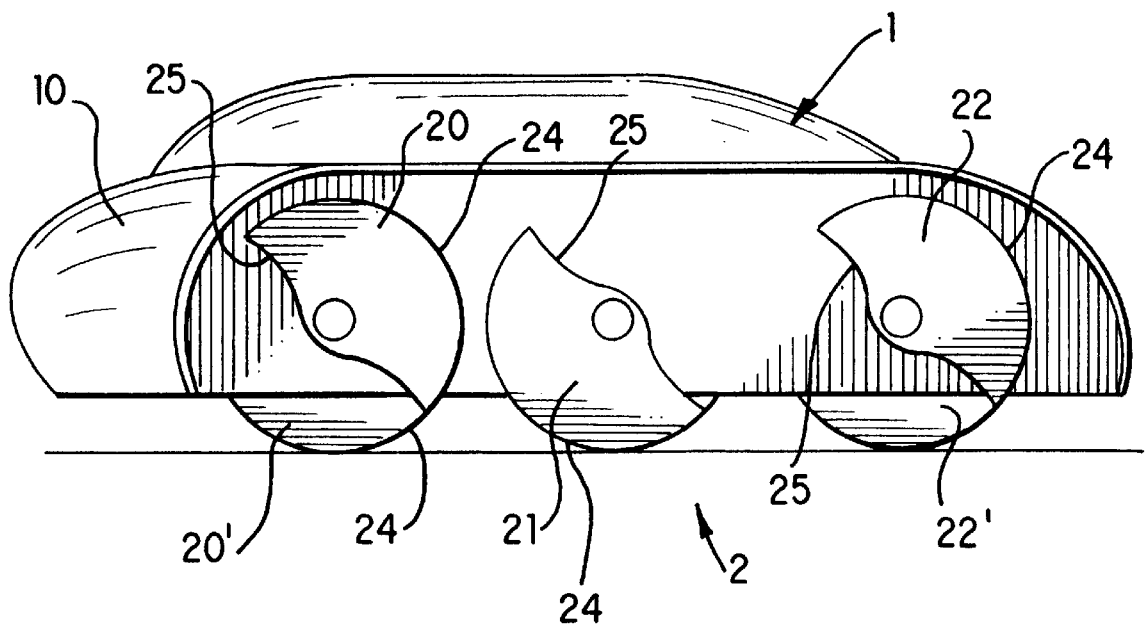
FIG. 3 is an elevational view of the embodiment of the invention shown in FIG. 1.

Referring now to FIG. 1, there is shown one preferred embodiment of the subject multi-terrain amphibious vehicle. Multi-terrain amphibious vehicle 1 generally includes a chassis assembly 10 to which are rotatably coupled a plurality of half-wheels, or propulsion members 20, 21, 22 along one side and a plurality of propulsion members 20', 21', 22' along the other side. The precise configuration of chassis assembly 10 is not important to the present invention and, therefore, is not shown in great detail. In most applications, however, chassis assembly 10 will generally include a passenger or payload compartment 12 situated over and within a main chassis 14 within which are mounted and housed the control mechanisms to be described in following paragraphs, as well as the power generation, steering, and other components typically necessary in a self-propelled vehicle.

One feature of particular note regarding main chassis 14 is that where operation of vehicle 1 over water surfaces is intended, its underbody portion would preferably form a hull structure that provides the necessary buoyancy to enable such operation. In that case, any suitable techniques known in the prior art may be employed to seal all openings formed into water-accessible portions of main chassis 14 necessitated by the coupling of propulsion members 20–22, 20'–22' and other vehicle components thereto.

The propulsion members 20–22, 20'–22' disposed at a common side of main chassis 14 are relatively positioned such that they share a common rotation plane. Preferably, a propulsion member 20, 21, 22 on one side of main chassis 14 is coaxially disposed opposite a corresponding propulsion member 20', 21', 22' positioned adjacent the opposing side of main chassis 14. While the opposed pairs of propulsion members 20–20', 21–21', 22–22' are preferably disposed in substantially coaxial manner; they need not be mounted to a common axle, for it is important that they be rotatable independent of one another. Where a common axle mechanism is employed for a pair of coaxially disposed propulsion members, it is important that a suitable form of any differential-type mechanism known in the prior art be employed to provide this independence, or decoupling, of the propulsion members' rotational movements. Of course, the differential mechanism must be operable in such manner that the stability of the vehicle's support on the given surface is at no time compromised; that is, a sufficient number and combination of propulsion members 20–22, 20'–22' must, at any given time during the vehicle's travel, be oriented to contact the underlying surface. The inclusion or particular configuration of such differential mechanism, however, forms no essential part of the present invention.

Turning to FIG. 2, there is shown a blown-up view of one propulsion member 20 of FIG. 1 (at a different angular orientation than in FIG. 1). As indicated by the directional arrows 26, propulsion member 20 is rotatable about a rotation axis defined through the center of its axle 23. Propulsion member 20 is formed with an arcuate perimeter segment 24 which extends angularly about axle 23 to subtend approximately 180°. Propulsion member 20 also includes a second perimeter segment 25 which, unlike perimeter segment 24, does not define a segment of a circular wheel. Rather, it defines a curvilinear surface that abruptly discontinues the circular wheel contour traced by first perimeter segment 24. The primary purpose of perimeter segment 25 is to engage and transfer to the vehicle's underlying surface the force generated by the rotation of the given propulsion member 20 in a direction tangential to the direction of rotation, such that the propulsion member 20 'pushes off' of the underlying surface portion to generate a thrust that propels vehicle 1. Accordingly, the surface of second perimeter segment 25 preferably includes at least one portion which extends substantially radially with respect to the propulsion member's axial center.

The surface of second perimeter segment 25 is preferably an undulating surface, as shown, where water surfaces are likely to be often encountered. The undulating profile provides a streamlined contour that would minimize the resulting drag through water without significant detrimental effect on its ability to displace fluid in a paddling action.

Given the non-circular perimeter defined by the first and second perimeter segments 24, 25 of a given propulsion member 20, it is preferable that counterbalancing measures be taken to substantially equalize the distribution of mass about the propulsion member's rotation axis. Otherwise, prohibitively disruptive vibrations may result when propulsion member 20 rotates, particularly when it rotates at a high rotational velocity. Any suitable technique known in the prior art may be employed to realize such counterbalancing. For instance, counterbalancing weight elements (not shown) may be fastened at appropriate points on the given propulsion member 20.

Although not necessary in practicing the most basic form of the present invention, propulsion members 20–22' would, each, ideally be driven independently. In view of the gains to be made in simplicity and expense, however, the propulsion members 20–22, 20'–22' grouped on opposing sides of main chassis 14 are driven together in their groups. The ability to independently control the rotation of propulsion members on opposing sides of main chassis 14 obviates the need—where a sufficient number of propulsion members are utilized to ensure continual stability in the vehicle's support—for a separate steering mechanism that might, for instance, require that the substantially co-planar arrangement of the propulsion members 20–22' be repeatedly disturbed. Such disturbance correspondingly disturbs the alignment of force components derived from the operation of the individual propulsion members 20–22', compromising the magnitude of the overall thrust generated thereby.

A skid steering technique thus may be employed in an appropriate case, whereby a left drive train (not shown) is provided for driving propulsion members 20–22 and a separate right drive train (not shown) is provided for driving the propulsion members 20'–22'. The drive trains would be fully reversible, the relative magnitudes and directions of their driving actions determining the speed and heading of vehicle 1.

Note that in an embodiment, such as shown in FIGS. 1 and 3, utilizing less than four propulsion members on either side of the main chassis 14 the skid steering technique may not be practicable without introducing additional means to prevent the loss of stability in the vehicle's support on the underlying surface. A conventional steering technique known in the prior art may for that reason be preferable for such an embodiment, while the skid steering technique would be preferable for embodiments utilizing four or more propulsion members on either side of main chassis 14.

Referring to FIG. 3, as the nature and magnitude of both the support for chassis assembly 10 and the transfer of force transferred thereby onto the underlying surface 2 provided by propulsion members 20–22' at any instant in time is dependent on the propulsion members' angular orientations, it is important that suitable measures be taken to control the relative rotational phases of those propulsion members 20–22'. With the relative rotational phase settings shown in FIG. 3, contact with surface 2 by the first perimeter segment 24 of at least one propulsion member 20–22' is maintained on each side of chassis assembly 10. At the operational instant in time depicted, propulsion members 20', 21, 22' have their first perimeter segments 24 concurrently contacting surface 2. As the vehicle advances, the first perimeter segments 24 of propulsion members 20, 22, and 21' (not shown) will rotate into contact with surface 2 just as the first perimeter segments 24 of propulsion members 20', 21, and 22' rotate out of contact with surface 2. This enables vehicle 1 to roll along a smooth, flat surface in stable manner as would any other normal wheeled vehicle.

In practice, it is necessary that each propulsion member 20–22' be properly counterbalanced such that a bouncing, or wobbling, does not occur at higher rates of rotation. Any suitable counterbalancing technique known in the prior art may be employed; the choice of such technique is not important to the present invention.

In rough, uneven terrain, the second perimeter segments 25 of propulsion members 20–22' serve to engage, rotate over, and push off against formations protruding vertically from surface 2. The 'clawing' action that results enables vehicle 1 to advance over terrain which would impede the progress of vehicles employing circular wheels of practicable radial dimensions.

Where the underlying surface is not a hard surface, but is rather water, mud, snow, or other such surface; the second perimeter segments 25 of the propulsion members 20–22' serve to dig and displace the underlying surface material relative to vehicle 1 such that a vehicle-propelling action results. Suitable measures known in the art are taken to substantially seal all openings in chassis assembly 10 accessible to the surface material to render chassis assembly 10 buoyant. The numerous techniques for forming such seals are well-known in the art and are not detailed here, as those details form no part of the present invention.

In other embodiments of the present invention, the overall traction of vehicle 1 realized over a given surface 2 may be optimized for the particular attributes of that surface 2 simply by altering the relative rotational phases of propulsion members 20–22'. Where, for instance, a successive activation of 'clawing' or 'paddling' actions of propulsion members 20–22' sequentially offset in time is more favorable to traction over the given surface 2 than a more concurrent activation of such actions, the second propulsion members 21, 21' may be set to respectively lag behind the rotational phases of propulsion members 20, 20'; and, the rotational phases of propulsion members 22, 22' may be set to respectively lag behind the rotational phases of propulsion members 21, 21'.

It is clear that given independent control mechanisms for setting the rotational phases of each propulsion member 20–22', any number of rotational phase settings may be employed to optimize the vehicle's overall traction for the given environmental conditions. Preferably, suitable measures are taken to enable 'on the fly' setting of those phases.

Propulsion members 20–22' may be formed of any composition known in the art which are characterized by levels of strength, durability, and material properties sufficient to serve the given vehicle's intended applications. In the preferred embodiment, each propulsion member 20–22' is realized as a solid, integrally-formed rubber structure.

Figure 4:
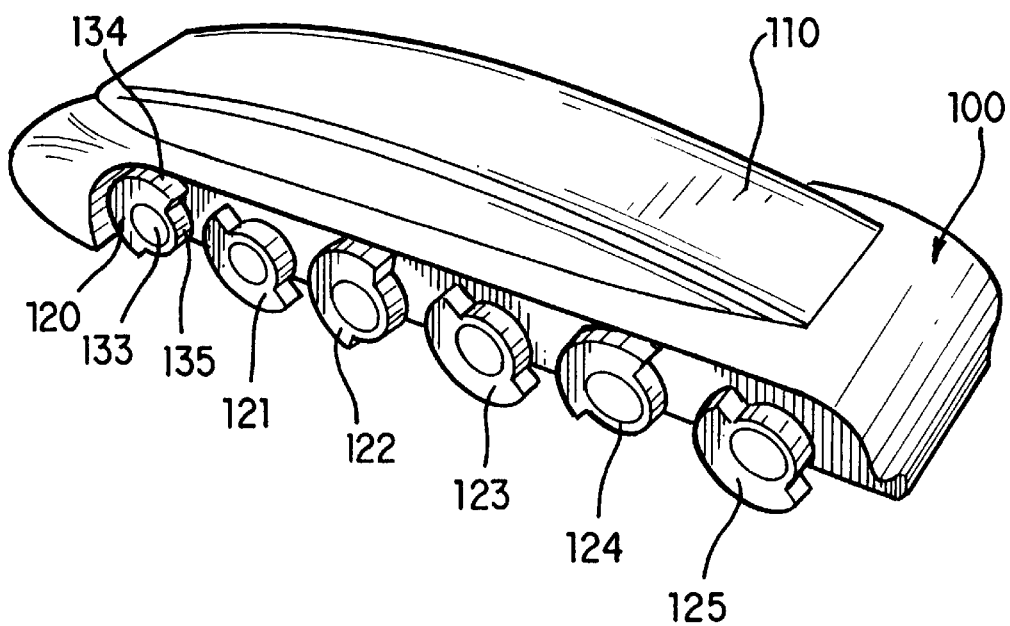
FIG. 4 is a perspective view of an alternate embodiment of the present invention.

Turning now to FIG. 4, there is shown an alternate embodiment of the present invention. In accordance with this alternate embodiment, a multi-terrain amphibious vehicle 100 includes a chassis assembly 110 to which are mounted on each side thereof six propulsion members 120–125. Each propulsion member 120 includes an arcuate first perimeter segment 134 angularly extending about an axle 133 to subtend approximately 180°. A pair of radially-cut flat surfaces connected by a semi-circular segment of approximately 180°, but of significantly lesser radial extent than that of first perimeter segment 134, forms each propulsion member's second perimeter segment 135.

FIGS. 5a–5e illustrate the progression of propulsion members 120–125 as vehicle 100 advances over a surface 2. With the rotational phase settings of propulsion members 120–125 shown, propulsion members 121, 123, and 125, as well as those propulsion members not visible but coaxially disposed on the opposing side of the vehicle's chassis assembly 110 contact surface 2 at the operational instant in time depicted. At a subsequent instant in time, FIG. 5b shows the rotations of propulsion members 120–125 as the vehicle 100 advances along surface 2. Stable support of vehicle 100 on surface 2 is thus maintained. At a next point in time, FIG. 5c shows the propulsion members 120–125 to have rotated to the point where they simultaneously contact the surface 2. Beyond this instant in time, FIG. 5d shows that propulsion members 120, 122, and 124 are now contacting surface 2 just as propulsion members 121, 123, and 125 rotate out of contact with surface 2. At an even later instant in time, FIG. 5e shows that the rolling action of the arcuate first perimeter segments on propulsion members 120, 122, and 124 continues the vehicle's advancement along surface 2.

Figure 6A:
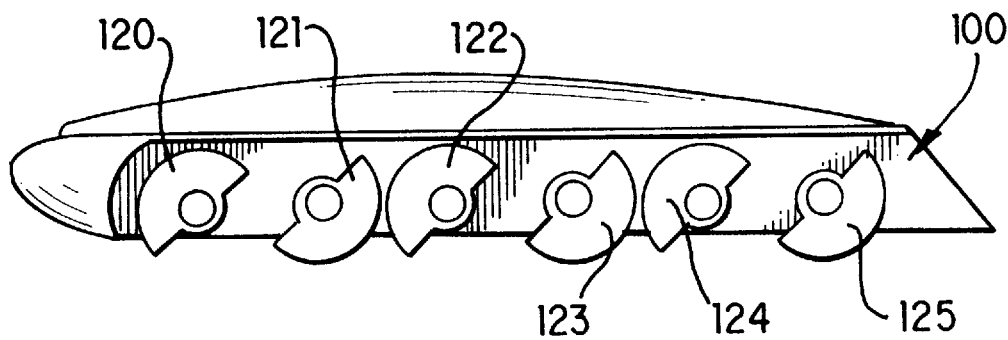
FIG. 6a is an elevational view of the alternate embodiment shown in FIG. 4, illustrating the angular orientation of the propulsion members with a first setting of the relative rotational phases therefor.
Figure 6B:
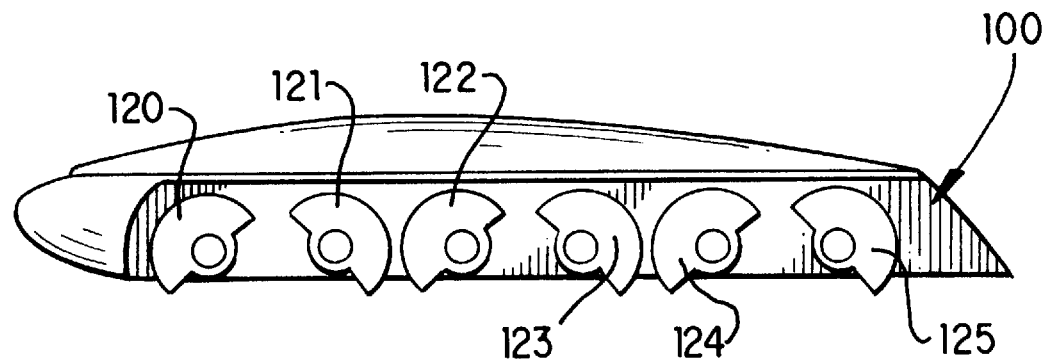
FIG. 6b is an elevational view of the alternate embodiment shown in FIG. 4, illustrating the angular orientation of the propulsion members with a second set of rotational phase settings therefor.
Figure 6C:
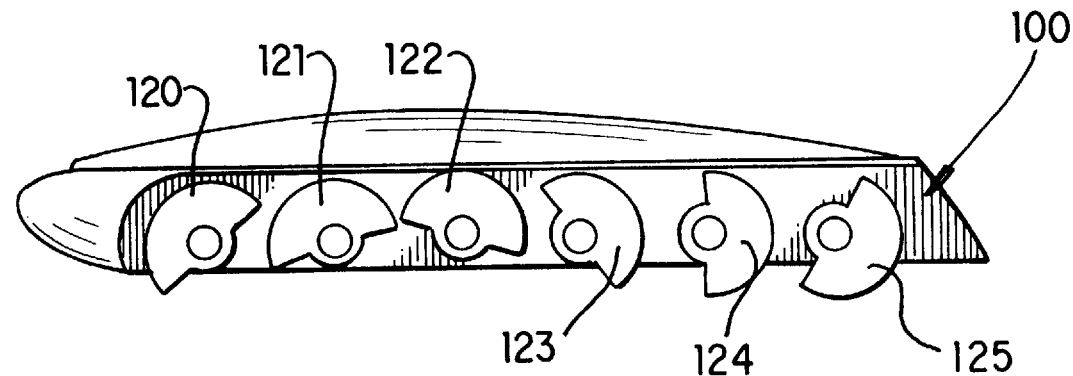
FIG. 6c is an elevational view of the alternate embodiment shown in FIG. 4, illustrating the angular orientation of the propulsion members with a third set of rotational phase settings therefor.

Some of the numerous relative rotational phase settings of propulsion members 120–125 grouped on a given side of chassis assembly 110 are shown in FIGS. 6a–6c. Any number of relative rotational phase settings may be employed to suit the attributes of the surface being traveled across.

Figure 7A:
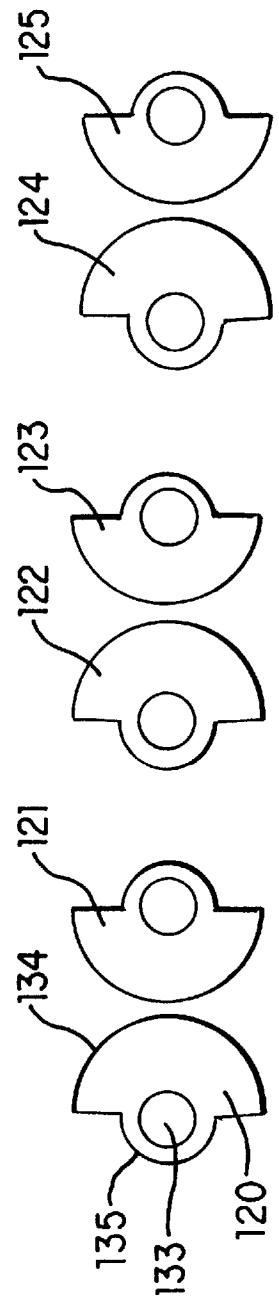
FIG. 7a is an elevational view of only the propulsion members in the alternate embodiment of FIGS. 6a–6c, with a fourth set of relative phase settings therefor.
Figure 7B:
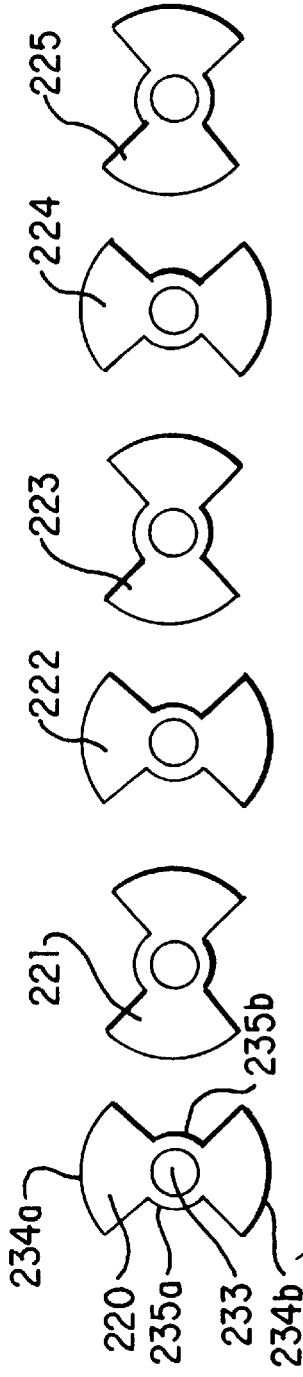
FIG. 7b is an elevational view of only the propulsion members in another alternate embodiment of the present invention.
Figure 7C:
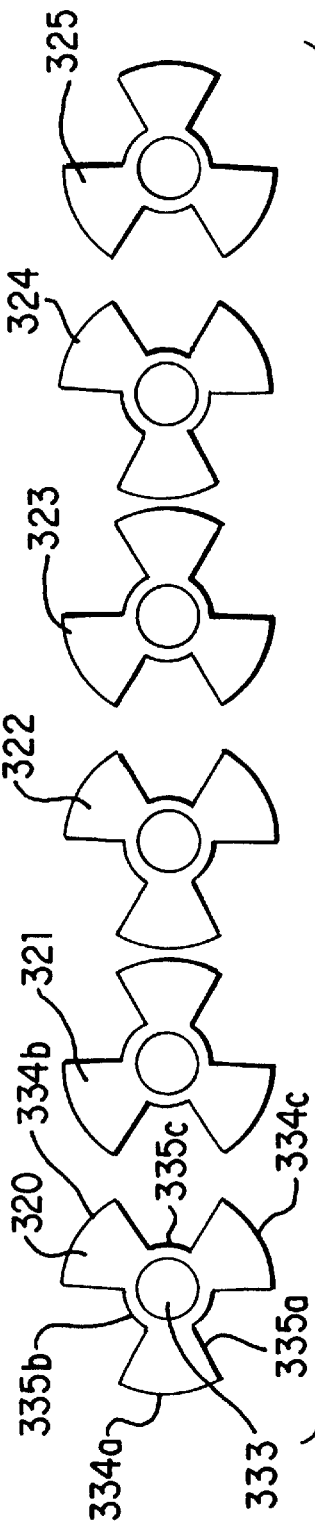
FIG. 7c is an elevational view of only the propulsion members in yet another alternate embodiment of the present invention.

Turning now to FIGS. 7a–7c, there are shown in FIGS. 7b, 7c two alternate embodiments for the configuration of propulsion members that may be employed on vehicle 100.

In FIG. 7b, each propulsion member 220–225 is formed with a pair of diametrically opposed arcuate first perimeter segments 234a, 234b separated by a pair of diametrically-opposed second perimeter segments 235a, 235b. Preferably, the arcuate first segments 234a, 234b of each propulsion member 220–225 are formed to cumulatively subtend a total angle of approximately 180° about the center of axle 233. In the alternate embodiment of FIG. 7c, each propulsion member 320–325 is formed with three arcuate first perimeter segments 334a, 334b, 334c offset angularly about the center of axle 333 in substantially equidistant manner, separated by three second perimeter segments 335a, 335b, 335c. Preferably, first perimeter segments 334a, 334b, 334c cumulatively subtend an angle of approximately 180° about the center of axle 333.

Figure 8A:
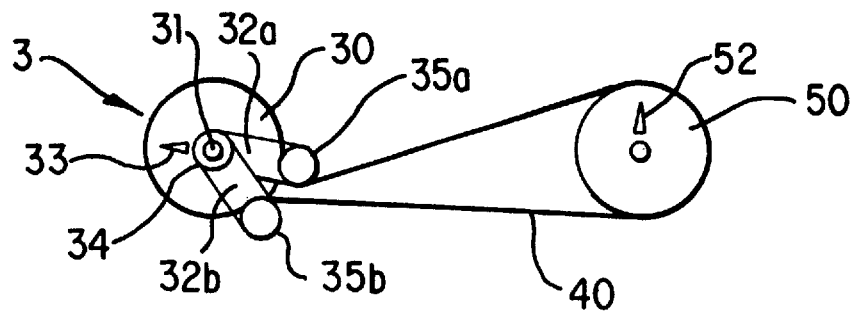
FIG. 8a is a schematic diagram illustrating the operation in a first configuration of one preferred embodiment of the control mechanism in the present invention.
Figure 8B:
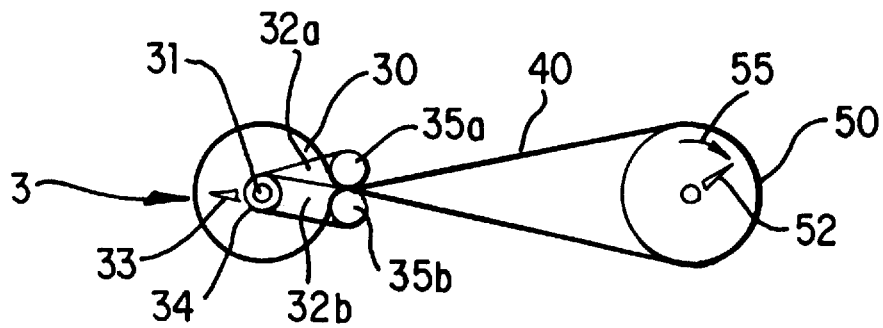
FIG. 8b is a schematic diagram illustrating the operation in a second configuration of the embodiment shown in FIG. 8a of the control mechanism in the present invention.
Figure 8C:
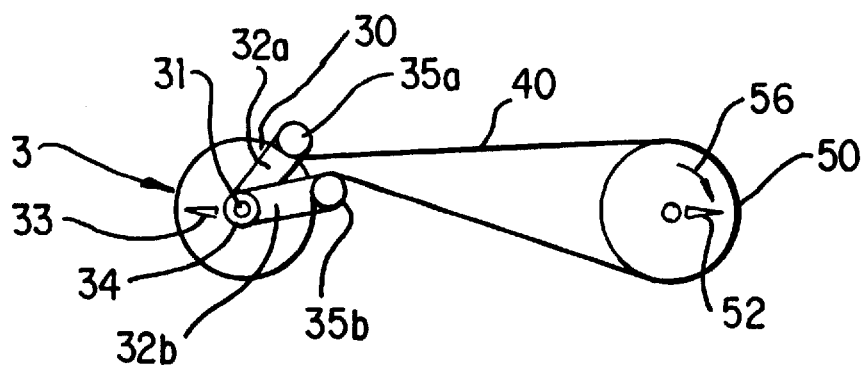
FIG. 8c is a schematic diagram illustrating the operation in a third configuration of the embodiment shown in FIG. 8a of the control mechanism in the present invention; and, FIG. 9 is a perspective view of a propulsion member unit in an alternate embodiment of the present invention.

Turning finally to FIGS. 8a–8c, there are shown schematic diagrams for illustrating the operation of one preferred embodiment of a control mechanism for driving and setting the rotational phase of a propulsion member in accordance with the present invention. The control mechanism 3 generally includes a gear or other such drive member 30 rotated about a drive axle 31 by an onboard power source (not shown); a transmission gear member 50 coaxially mounted to a propulsion member; and, a drive chain 40 driven thereon through an endless loop. Coaxially coupled to gear 30 is a pivot member 34 from which a pair of adjustment arms 32a, 32b radially extend. At the respective free ends of adjustment arms 32a, 32b are coupled freely rotatable pulleys 35a, 35b. Drive chain 40 loops around gear 30, pivots at pulley 35a, loops around transmission gear 50, pivots at pulley 35b, then loops back into engagement with gear 30 to close the endless loop through which it advances.

Transmission gear 50 is fixedly coupled to the given propulsion member such that, as it is driven to rotate by the advancement of drive chain 40 through its endless loop, the propulsion member is responsively rotated. Clearly, the speed with which the propulsion member is rotated may simply be controlled by the speed with which gear 30 is driven to rotate by the onboard power source (not shown). The rotational phase of the given propulsion member may likewise be controlled by controlling the rotational phase of transmission gear 50.

Adjustment arms 32a, 32b may be pivotally displaced about pivot member 34 relative to gear 30. When adjustment arms 32a, 32b are displaced as shown in FIGS. 8b, 8c, the shape of the loop traveled by drive chain 40 is altered accordingly since the pivot points defined at pulleys 35a, 35b are displaced with adjustment arms 32a, 32b. The relative angular orientation of transmission gear 50, as indicated by its indicator 52, is responsively altered relative to the indicator 33 of gear 30, as indicated by directional arrows 55, 56. Hence, the rotational phase of the propulsion member coupled to transmission gear 50 is controllably set.

Preferably, the displacements of adjustment arms 32a, 32b are actuated by a dedicated motor of any suitable type known in the art, such as a DC cobalt magnet motor. At least one such rotational phase setting motor is preferably employed for the grouped propulsion members on each side of the given vehicle's chassis assembly.

Figure 9:
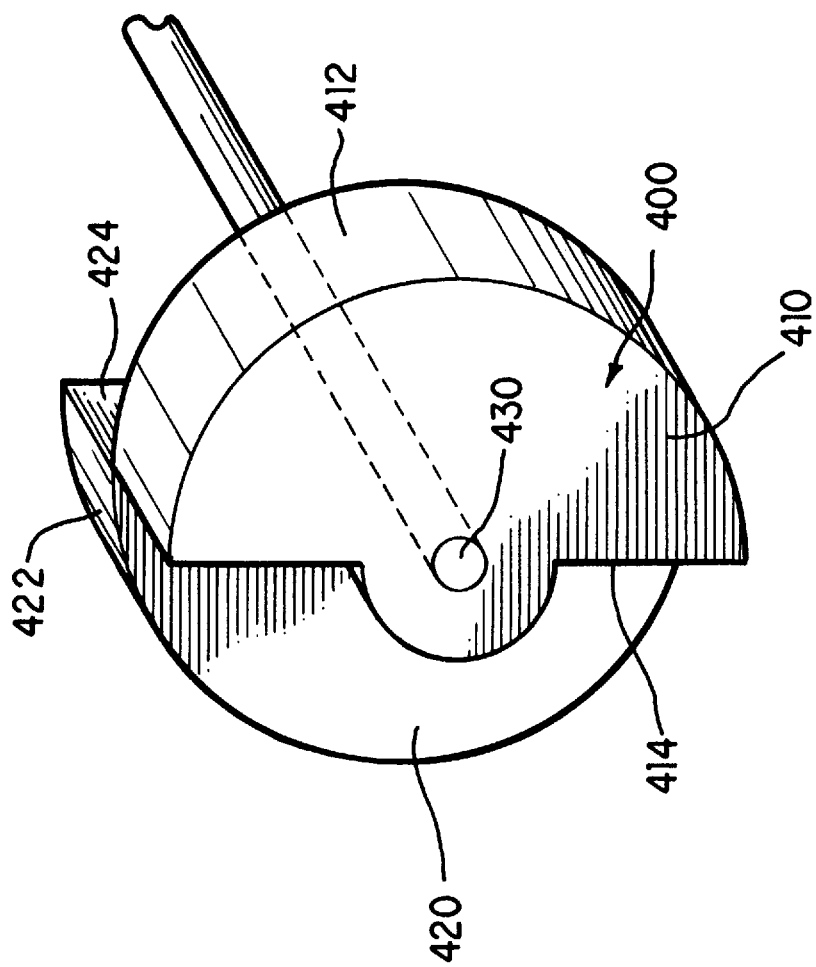

In any embodiment of the present invention, at one 'wheel' site of vehicle 1 at which a propulsion member is disposed, a plurality of propulsion members may be coaxially mounted in adjacent manner to function as a propulsion member unit. In the alternate embodiment illustrated in FIG. 9, a pair of propulsion members 410, 420 mounted to a common axle 430 form a propulsion member unit 400. Each propulsion member 410, 420 is rotatable relative to the given vehicle chassis; however, the two propulsion members 410, 420 are preferably mounted in such manner that they are not angularly displaceable relative to each other. The propulsion members 410, 420 of a given propulsion member unit 400 are, moreover, mounted in such manner that their first perimeter segments 412, 422, and consequently their second perimeter segments 414, 424, remain angularly offset during operation of the given propulsion member unit 400. The combined actions of the surfaces of the perimeter segments 412, 422 and 414, 424 augments both the traction and stability ultimately realized by vehicle 1. The combined action thus enhances the propulsion force which may be generated at the given 'wheel' site of vehicle 1.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and the number and configuration of various vehicle components described above may be altered, all without departing from the spirit or scope of the invention as defined in the appended Claims.

What is claimed is:

1. A multi-terrain amphibious vehicle adapted for travel across a surfaces comprising:
   (a) a chassis assembly extending in a longitudinal direction;
   (b) a plurality of propulsion members disposed in longitudinally spaced pairs, each said pair of propulsion members being respectively disposed on two opposing sides of said chassis assembly and rotatably coupled to said chassis assembly for propelling said vehicle across the surface, each of said propulsion members being rotatable about a rotation axis extending in a direction substantially normal to said longitudinal direction and having a substantially non-circular contour, each said propulsion member having coaxially disposed in angularly offset manner about said rotation axis at least a first perimeter segment and a second perimeter segment for engaging the surface, said first perimeter segment having an arcuate contour and extending radially farther from said rotation axis than said second perimeter segment; and,
   (c) control means coupled to said plurality of said propulsion members for altering traction of said vehicle, said control means including means for adjusting and maintaining a phase of one propulsion member relative to another throughout a revolution thereof for cooperatively rotating said plurality of propulsion members to collectively impart a predetermined speed and direction of travel to said vehicle over different terrains.

2. A multi-terrain amphibious vehicle adapted for travel across a surface, comprising:
   (a) a chassis assembly extending in a longitudinal direction;
   (b) a plurality of propulsion members rotatably coupled to said chassis assembly for propelling said vehicle across the surface, each of said propulsion members being rotatable about a rotation axis extending in a direction substantially normal to said longitudinal direction and having a substantially non-circular contour, each said propulsion member having coaxially disposed in angularly offset manner about said rotation axis at least a first perimeter segment and a second perimeter segment for engaging the surface, said first perimeter segment having an arcuate contour and extending radially farther from said rotation axis than said second perimeter segment; and,
   (c) control means for altering traction of said vehicle coupled to said plurality of propulsion members for rotating said plurality of propulsion members to collectively impart a predetermined speed and direction of travel to said vehicle over different terrains, said control means includes for each of said plurality of propulsion members (a) an independently actuatable rotational phase setting mechanism, (b) a drive gear, and (c) at least one endless loop drive chain engaged with said drive gear, said endless loop drive chain defining a loop contour and mechanically coupling a respective one of said propulsion members to said drive gear, said phase setting mechanism including means for altering said loop contour.

3. A multi-terrain amphibious vehicle adapted for travel across a surfaces comprising:
   (a) a chassis assembly extending in a longitudinal direction;
   (b) a plurality of propulsion members disposed in longitudinally spaced pairs, each said pair of propulsion members being respectively disposed on two opposing sides of said chassis assembly and rotatably coupled to said chassis assembly for propelling said vehicle across the surface, each of said propulsion members being rotatable about a rotation axis extending in a direction substantially normal to said longitudinal direction and having a substantially non-circular contour, each said propulsion member having coaxially disposed in angularly offset manner about said rotation axis at least a first perimeter segment and a second perimeter segment for engaging the surface, said first perimeter segment having an arcuate contour and extending radially farther from said rotation axis than said second perimeter segment; and,
   (c) control means for altering traction of said vehicle coupled to said plurality of propulsion members, said control means including means for independently adjusting a rotational phase of each said propulsion member relative to an adjacent longitudinally displaced propulsion member to collectively establish said vehicle's level of traction imparted the surface and provide a predetermined speed and direction of travel to said vehicle over different terrains.

4. The multi-terrain amphibious vehicle as recited in claim 3 where said means for independently adjusting a rotational phase includes:
   a drive gear;
   an endless loop drive chain mechanically coupling a respective propulsion member to said drive gear, said endless loop drive chain having a predetermined contour; and,
   means for altering said predetermined contour of said endless loop drive chain to alter a relative phase of said propulsion member.

* * * * *